(12) United States Patent
Holda

(10) Patent No.: US 12,188,613 B1
(45) Date of Patent: Jan. 7, 2025

(54) SYSTEMS AND METHODS FOR DETERMINING PRESENCE OF WATER IN OIL FOR A MARINE ENGINE

(71) Applicant: Brunswick Corporation, Mettawa, IL (US)

(72) Inventor: Joseph A. Holda, West Bend, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 18/483,157

(22) Filed: Oct. 9, 2023

(51) Int. Cl.
*F16N 29/04* (2006.01)

(52) U.S. Cl.
CPC .......... *F16N 29/04* (2013.01); *F16N 2200/20* (2013.01); *F16N 2210/06* (2013.01)

(58) Field of Classification Search
CPC .. F16N 29/07; F16N 2200/20; F16N 2210/06; F01M 11/10; F01M 2011/148; F01M 2011/1473
USPC ....................................................... 184/108
See application file for complete search history.

(56) References Cited

U.S. PATENT DOCUMENTS

| | | | |
|---|---|---|---|
| 4,940,965 A * | 7/1990 | Umehara ................. | B21C 3/00 340/517 |
| 5,599,460 A * | 2/1997 | Van Schoiack ........ | B01D 17/10 210/801 |
| 6,463,796 B1 * | 10/2002 | Van Mullekom ...... | F01M 11/04 73/114.55 |
| 9,193,429 B1 * | 11/2015 | Langenfeld ............ | B63H 20/32 |
| 10,494,967 B1 | 12/2019 | Osthelder et al. | |
| 10,711,668 B2 * | 7/2020 | Amin ...................... | B60R 17/02 |
| 11,235,848 B1 | 2/2022 | Jaszewski et al. | |
| 2015/0082871 A1 * | 3/2015 | Zha ..................... | G01N 33/2888 73/53.05 |
| 2019/0360371 A1 * | 11/2019 | Niederriter ............ | F01M 11/10 |
| 2020/0325657 A1 * | 10/2020 | Takami ................... | E02F 9/267 |

* cited by examiner

*Primary Examiner* — Michael R Mansen
*Assistant Examiner* — Mark K Buse
(74) *Attorney, Agent, or Firm* — Andrus Intellectual Property Law, LLP (57) ABSTRACT

Systems and associated methods are for a marine drive and/or a marine generator The system has an engine, a temperature sensor configured to sense changes in temperature of oil for the engine, a speed sensor configured to sense changes in operational speed of the engine, and a control module configured to identify a presence of water in the oil by comparing the changes in the temperature of the oil to the changes in operational speed of the engine.

16 Claims, 7 Drawing Sheets

| ENGINE SPEED (RPM) | OIL TEMP (°C) |
|---|---|
| 651 | 41.5 |
| 1400 | 57.7 |
| 2100 | 76.5 |
| 2300 | 82.5 |
| 2500 | 85.7 |
| 2700 | 90.9 |
| 3000 | 95.9 |
| 3200 | 98.7 |
| 3400 | 100.9 |
| 3600 | 104.6 |
| 3800 | 107.1 |
| 4000 | 109.7 |
| 4200 | 113.0 |
| 4400 | 113.8 |
| 4600 | 116.9 |
| 4800 | 121.0 |
| 5000 | 126.5 |
| 5200 | 125.9 |
| 5400 | 128.3 |
| 5600 | 130.2 |
| 5800 | 134.3 |
| 6000 | 137.8 |
| 6200 | 141.8 |
| 6400 | 145.2 |
| 6600 | 148.0 |

*FIG. 7*

SYSTEMS AND METHODS FOR DETERMINING PRESENCE OF WATER IN OIL FOR A MARINE ENGINE

FIELD

The present disclosure relates to marine drives, and particularly to systems and methods for sensing the presence of water in the oil for a marine engine.

BACKGROUND

The following U.S. Patents provide background and are incorporated herein by reference:

U.S. Pat. No. 10,494,967 discloses a system for determining an oil amount in a marine drive. The system includes an oil level sensor that senses an oil level in the sump and temperature sensor sensing an engine temperature. A control module for the system is configured to determine that the engine temperature is greater than a temperature threshold, and that an engine speed exceeds a speed threshold for at least a predetermined time period or that a throttle position exceeds a throttle position threshold. If both such conditions are met, and a threshold drop in engine speed to an idle threshold is detected or a threshold change in throttle position to an idle position is detected, then an oil level in the sump is sampled with an oil level sensor. An oil amount is then determined based on the sampled oil level in the sump.

U.S. Pat. No. 11,235,848 discloses a cooling system for an outboard motor of a marine vessel. The cooling system includes an oil sump housing having an inner housing wall and an outer housing wall. The inner housing wall defines a transmission mounting cavity, and the inner housing wall and the outer housing wall defines an oil containment cavity that at least partially surrounds the transmission mounting cavity. The cooling system further includes a first sprayer nozzle and a second sprayer nozzle. Both the first sprayer nozzle and the second sprayer nozzle are coupled to the oil sump housing and configured to spray cooling fluid within the transmission mounting cavity onto an inner surface of the inner housing wall.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In non-limiting examples, systems are disclosed herein for a marine drive and/or a marine generator. The system comprises an engine, a temperature sensor configured to sense changes in temperature of oil for the engine, a speed sensor configured to sense changes in operational speed of the engine, and a control module configured to identify a presence of water in the oil by comparing the changes in the temperature of the oil to the changes in operational speed of the engine.

In independent embodiments, the control module may store a temperature range and a time period, and the control module may be configured to identify the presence of water in the oil when the temperature of the oil remains in the temperature range for the time period. In independent embodiments, the temperature range may include 100 degrees Celsius.

In independent embodiments, the control module may store a temperature range, a time period, and an engine speed threshold, and the control module may be configured to identify the presence of water in the oil when the temperature of the oil remains in the temperature range for the time period while the operational speed of the engine exceeds the engine speed threshold. In independent embodiments, the control module may be configured to only compare said changes in the temperature of the oil to said changes in operational speed of the engine when the operational speed of the engine exceeds the engine speed threshold. In independent embodiments, the control module may be configured to determine an amount of water in the oil based upon how long the temperature of the oil remains in the temperature range.

In independent embodiments, the control module may be configured to take a corrective action when the presence of water is identified. In independent embodiments, the system may further comprise an indicator device, wherein the corrective action may comprise operating an indicator device to alert a user of the presence of water. In independent embodiments, the corrective action may comprise storing data indicative of the presence of water as a marker for a warranty assessment. In independent embodiments, the corrective action may comprise operating the engine at a speed sufficient to increase the temperature of the oil and vaporize the water.

In non-limiting examples, methods are disclosed herein for identifying a presence of water in oil for an engine associated with a marine drive and/or a marine generator. The method may comprise sensing changes in temperature of the oil, sensing changes in operational speed of the engine, and identifying the presence of water in the oil by comparing the changes in the temperature of the oil to the changes in operational speed of the engine.

In independent embodiments, the method may comprise identifying the presence of water in the oil when the temperature of the oil remains in the temperature range for a predetermined time period. In independent embodiments, the temperature range may include 100 degrees Celsius.

In independent embodiments, the method may comprise identifying the presence of water in the oil when the temperature of the oil remains in a temperature range for a time period while the operational speed of the engine exceeds an engine speed threshold. In independent embodiments, the method may comprise only compare said changes in the temperature of the oil to said changes in operational speed of the engine when the operational speed of the engine exceeds the engine speed threshold. In independent embodiments, the method may comprise determining an amount of water in the oil based upon how long the temperature of the oil remains in the temperature range.

In independent embodiments, the method may comprise taking a corrective action when the presence of water is identified. In independent embodiments, the corrective action may comprise operating an indicator device to alert a user of the presence of water. In independent embodiments, the corrective action may comprise storing data indicative of the presence of water as a marker for a warranty assessment. In independent embodiments, the corrective action may comprise operating the engine at a speed sufficient to increase the temperature of the oil and vaporize the water.

Various other features, objects, and advantages will be made apparent from the following description taken together with the drawings.

BRIEF DESCRIPTION OF THE DRAWINGS

The present disclosure is described with reference to the following drawings.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Through research and development in the field of marine drives, the present inventors have determined that condensation may form and build up in the oil for an engine. The presence of water in oil can lead to excessive corrosion on critical surfaces, which could lead to high oil consumption or early worn seals. The filter media also absorbs water and creates higher restrictions such that they are more prone to triggering guardian alarms and/or running in bypass mode passing debris and potentially causing catastrophic damage to engine. Oil changes are typically completed at an interval of 100 engine hours. However, this does not account for pressure drop due to water contamination which has led to guardian faults on test engines and could lead to increased bypassing of contaminated oil into an engine. The sensing of water in the oil may be performed by a water sensor, and/or the filter degradation may be detected with multiple pressure sensors resulting in a pressure delta calculation/monitoring across the filter. However, the inclusion of additional sensors increases the complexity of the system and introduces additional points of failure to the marine drive.

In view of the foregoing problems and challenges recognized by the inventors, the inventors developed the disclosed systems and methods configured to reliably identify the presence of water in the oil for the engine of a marine drive using sensors that are configured to measure sense parameters of the marine drive for other purposes relating to the operation of the marine drive.

Figure 1:
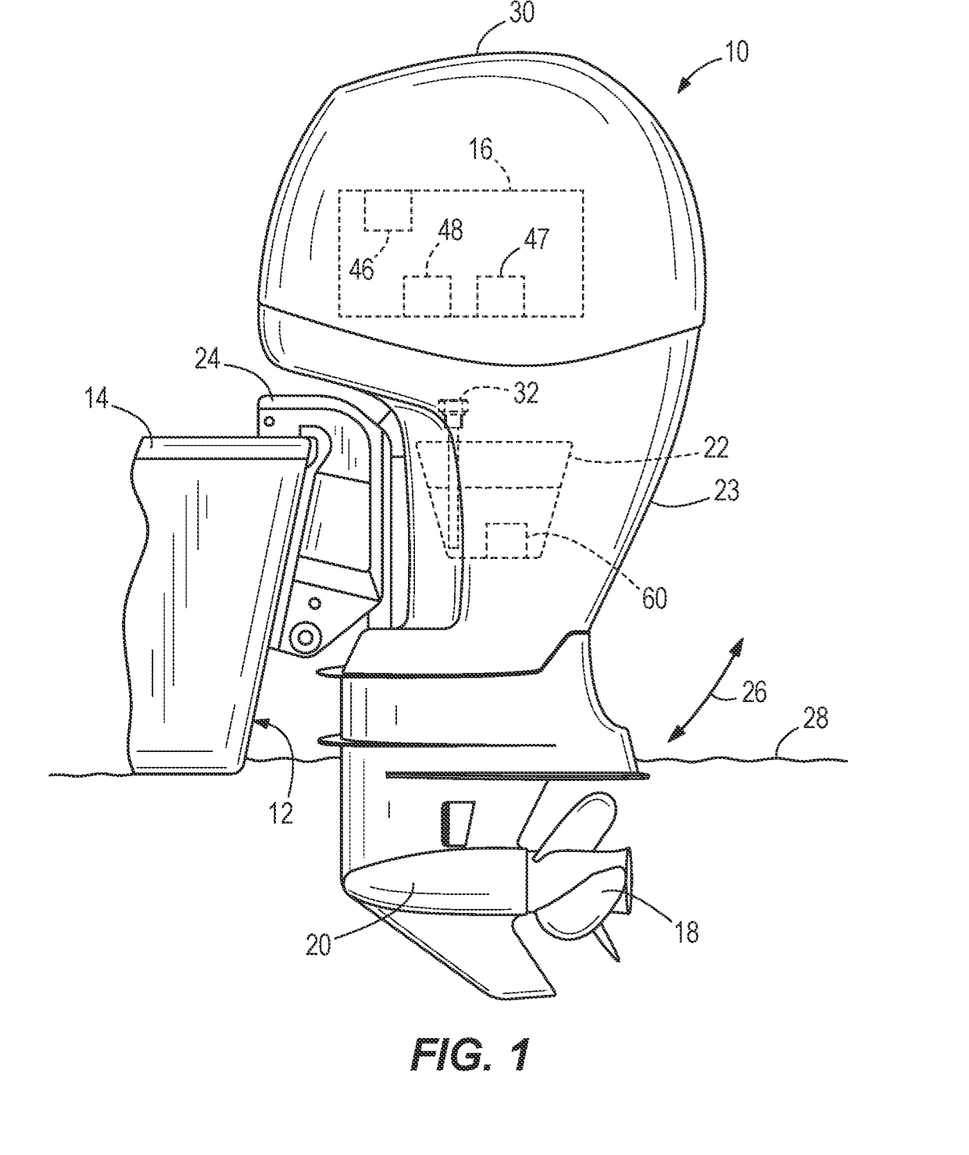
FIG. 1 is a schematic of an exemplary marine drive.

FIG. 1 depicts an exemplary marine drive 10, which is configured as an outboard motor having a powerhead housing 30 and mounted on the stern 12 of a marine vessel 14. The type and configuration of the marine vessel 14 and/or marine drive 10 may vary from that which is shown. For example, in other embodiments, the marine drive 10 may be an inboard motor, a stern drive, a jet drive, or any other type of propulsion device for propelling a marine vessel 14. The marine drive 10 includes an internal combustion engine 16 that is located in a powerhead housing 30 and causes rotation of a conventional propeller 18 extending from a propeller housing 20. In other examples the marine drive 10 may include an internal combustion engine forming part of a generator. A sump 22 is located in a drive shaft housing 23 beneath the internal combustion engine 16 and holds oil that is circulated to and from the internal combustion engine 16 for providing lubrication. The size, structure, and orientation of at least one of the sump 22, the internal combustion engine 16, the powerhead housing 30, the drive shaft housing 23, the propeller housing 20, and any other portion of the marine drive 10 and/or the marine vessel 14 can vary from that which is shown.

In the depicted embodiment, the marine drive 10, being an outboard motor, is pivotably connected to the stern 12 of the marine vessel 14 by a bracket 24, which facilitates trimming movement of the marine drive 10 along the direction shown by trim arrows 26 to thereby change the angle of the propeller 18 with respect to the waterline 28, as is conventional. Trimming of the marine drive 10 is employed during operation to adjust the angle of thrust on the marine vessel 14, and is also conventionally employed during maintenance, storage, and/or transportation of the marine vessel 14 over land.

Figure 2:
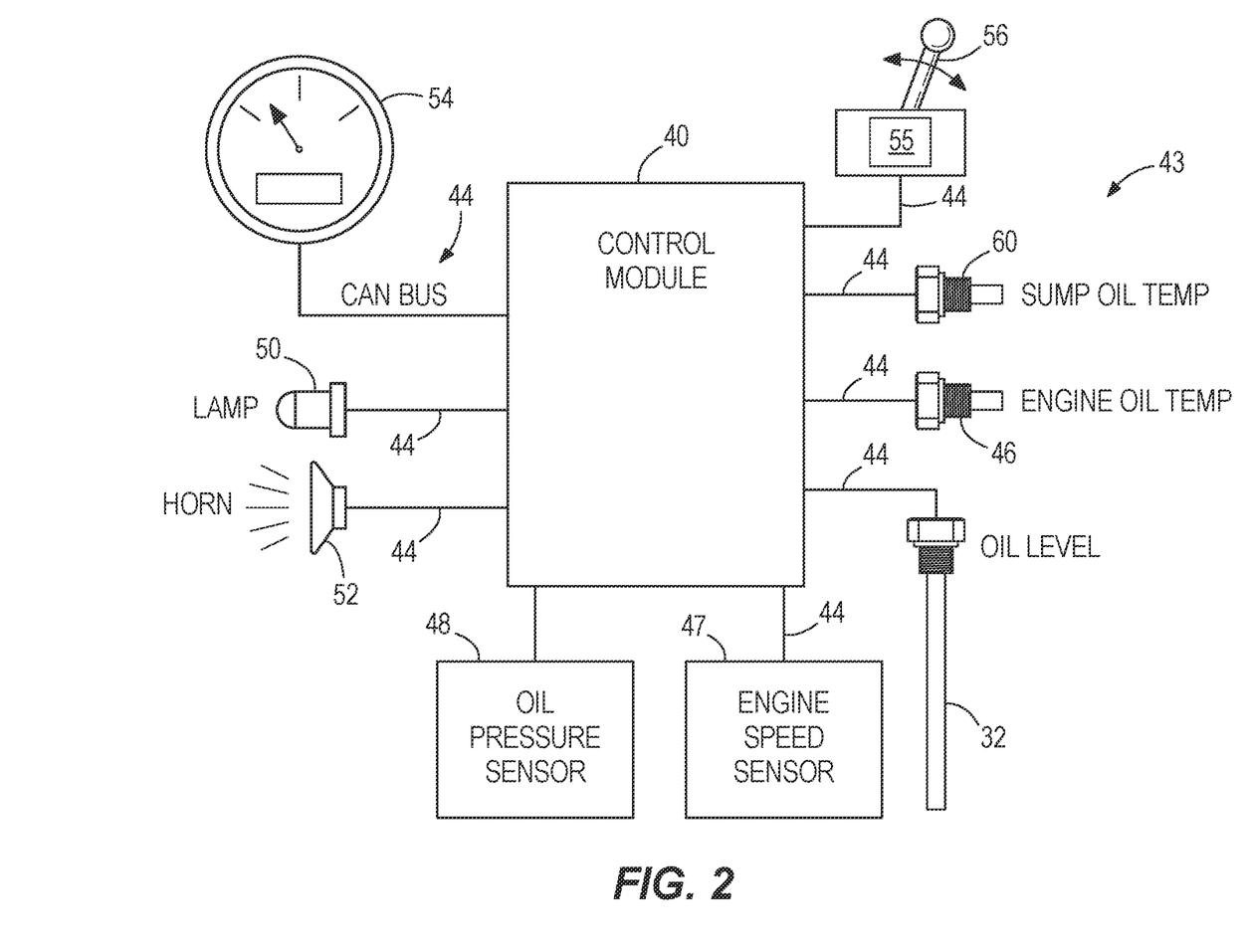
FIG. 2 is a schematic of an exemplary system for the marine drive.

FIG. 2 schematically depicts an embodiment of a novel system 43 for identifying the presence of water in the oil for an engine 16 of the marine drive 10 during operation of the marine drive 10. The system 43 includes a control module 40, such as an engine control module (ECM), that communicates with and controls various peripheral devices via communication links 44. In the depicted embodiment, the ECM receives input from a variety of sensors, for example a trim position sensor (not shown), an engine oil temperature sensor 46, an oil level sensor 32, an oil pressure sensor 48, a sump oil temperature sensor 60, an engine speed sensor 47, and/or a position sensor 55 sensing a demand input based on the position of the throttle lever 56. The control module 40 is configured to store values from the sensors 32, 46, 47, 48, 55, 60 and, as discussed in more detail below, and to identify a presence of water in the oil in particular by comparing changes of at least two of the recorded values. For example, the control module 40 may be configured to identify a presence of water in the oil by comparing the changes in the temperature of the oil to the changes in operational speed of the engine. In an independent example, the communication links 44 comprise a controller area network (CAN) bus, however other communication means may be used to facilitate communication between the various peripheral devices and the control module 40, including any wired or wireless communication means. It should be noted that the extent of connections of the communication links 44 represented in FIG. 2 are meant only to demonstrate that the various control elements are capable of communicating with one another, and do not represent actual wiring connections between the various elements, nor do they represent the only path of communication between the elements. For example, the communication links 44 may, in some embodiments, be performed by any of various types of wireless communication systems implementing any available wireless communication protocol.

The systems and methods described herein may be implemented with one or more computer programs executed by one or more processors, which may all operate as part of a single control module 40. The computer programs include processor-executable instructions that are stored on a non-transitory tangible computer readable medium. The computer programs may also include stored data, such as one or more lookup tables. Non-limiting examples of the non-transitory tangible computer readable medium are nonvolatile memory, magnetic storage, and optical storage.

As used herein, the term module may refer to, be part of, or include an application-specific integrated circuit (ASIC), an electronic circuit, a combinational logic circuit, a field programmable gate array (FPGA), a processor (shared, dedicated, or group) that executes code, or other suitable components that provide the described functionality, or a combination of some or all of the above, such as in a system-on-chip. The term module may include memory (shared, dedicated, or group) that stores code executed by the processor. The term code, as used herein, may include software, firmware, and/or microcode, and may refer to programs, routines, functions, classes, and/or objects. The term shared, as used above, means that some or all code from multiple modules may be executed using a single (shared) processor. In addition, some or all code to be executed by multiple different processors may be stored by a single (shared) memory. The term group, as used above, means that some or all code comprising part of a single module may be executed using a group of processors. Likewise, some or all code comprising a single module may be stored using a group of memories.

Referring to FIG. 2, the system 43 includes an oil level sensor 32 for sensing an oil level in the sump 22. In the depicted examples, the oil level sensor 32 is an electronic dipstick extending into the sump 22 for sensing oil level therein. In the illustrated embodiments, the oil level sensor 32 contains a reactive element for sensing the oil level. The type and configuration of oil level sensor 32 can vary from that shown. In one example, a resistance wire that extends at least from the maximum to minimum oil levels is heated by sending a constant current through it. A voltage drop across the wire depends on the amount of heat that is dissipated from the wire to the surrounding medium. Thus, the oil level in the sump 22 can be determined as oil conducts the heat better than air. The oil level sensor 32 communicates with a control module 40. The measured voltage drop value is compared in the control module 40 to values in a lookup table listing voltage drop versus temperature. This type of oil level sensor is commercially available and manufactured by Siemens VDO. Other types of electronic oil level sensors may be used, such as a float switch sensor having a float that marks the surface of the oil in the sump. In still other examples, an optical sensor, an electromagnetic wave sensor, or a range imaging camera serving as a "time-of-flight" sensor could be utilized to measure the oil level in the sump 22.

The system 43 further includes an engine oil temperature sensor 46 for sensing and providing a temperature of the oil for the internal combustion engine 16 to the control module 40. The output from the engine oil temperature sensor 46 may be monitored by the control module 40 in order to determine when the engine oil temperature is within a temperature range for at least a predetermined time period. In the illustrated embodiment, the engine oil temperature sensor 46 is configured as an oil temperature sensor measuring engine temperature as an oil temperature within the engine 16, and for sensing changes in the temperature of the engine 16. Additionally or alternatively, some embodiments may include an engine oil temperature sensor 46 configured as a coolant temperature sensor measuring engine temperature as an engine coolant temperature. furthermore, some embodiments of the system 43 further include an oil pressure sensor 48 configured to sense a pressure of the oil in the engine 16 and/or the oil pressure in the sump 22. the oil pressure sensor 48 may be positioned on or in the engine 16 and/or the sump 22.

With continued reference to FIG. 2, the system 43 includes an engine speed sensor 47 configured to sense a current engine speed of the internal combustion engine 16 and communicate with the control module 40. In the illustrated embodiments, the engine speed sensor 47 is configured to sense changes in operational speed of the engine 16. The engine speed sensor 47 may be configured to measure rotations per minute (RPM) of the engine 16. The type and location of the engine speed sensor 47 can vary, and in one example is a Hall Effect sensor or a variable reluctance sensor located near the encoder ring of the engine 16. Such an engine speed sensor 47 is known in the art and commercially available, for example, from CTS Corporation or Delphi. In the disclosed system and method, the engine speed output from the engine speed sensor 47 is monitored by the control module 40 in order to determine when the engine speed exceeds a speed threshold. As discussed in further detail below, the speed threshold is a calibratable value with a lower engine speed value and an upper engine speed value that are calibrated for identifying the presence of water in the oil of the engine 16.

In some embodiments, the control module 40 may be configured to receive signals indicative of the physical position of a throttle lever 56. The throttle lever 56, as an exemplary user input device, is manually moveable by a user to control torque and acceleration of a marine vessel. The position of the throttle lever 56 is sensed by position sensor 55, which provides a signal to the control module 40 representing the position of the throttle lever 56. Thus, a change position of the throttle lever 56 represents a demand for a change in vessel speed, i.e., commanding an acceleration or deceleration of the engine speed. In some embodiments, the system 43 may instead determine user demand via a throttle position sensor (TPS) configured to sense an angular position of the throttle valve or plate.

Referring to FIG. 2, the system 43 may include visual and/or audio indicator devices that may be used to indicate operational states of the marine drive 10 and/or display sensed operational parameters (e.g., operational speed of the engine 16, a temperature of the oil). In various examples, the indicator devices may include a lamp 50 that illuminates to provide a water presence indicator to a user, a horn 52 or speaker that provides an auditory water presence indicator an operator, and/or a display dial 54. As is common, the display dial 54 can indicate an oil amount in the marine drive 10 and may also provide a warning indicator when the oil amount is below a predetermined value. The depicted indicator devices are for exemplary purposes and are not limiting. Other known indicator devices are available, such as digital displays and/or the like.

Figure 3:
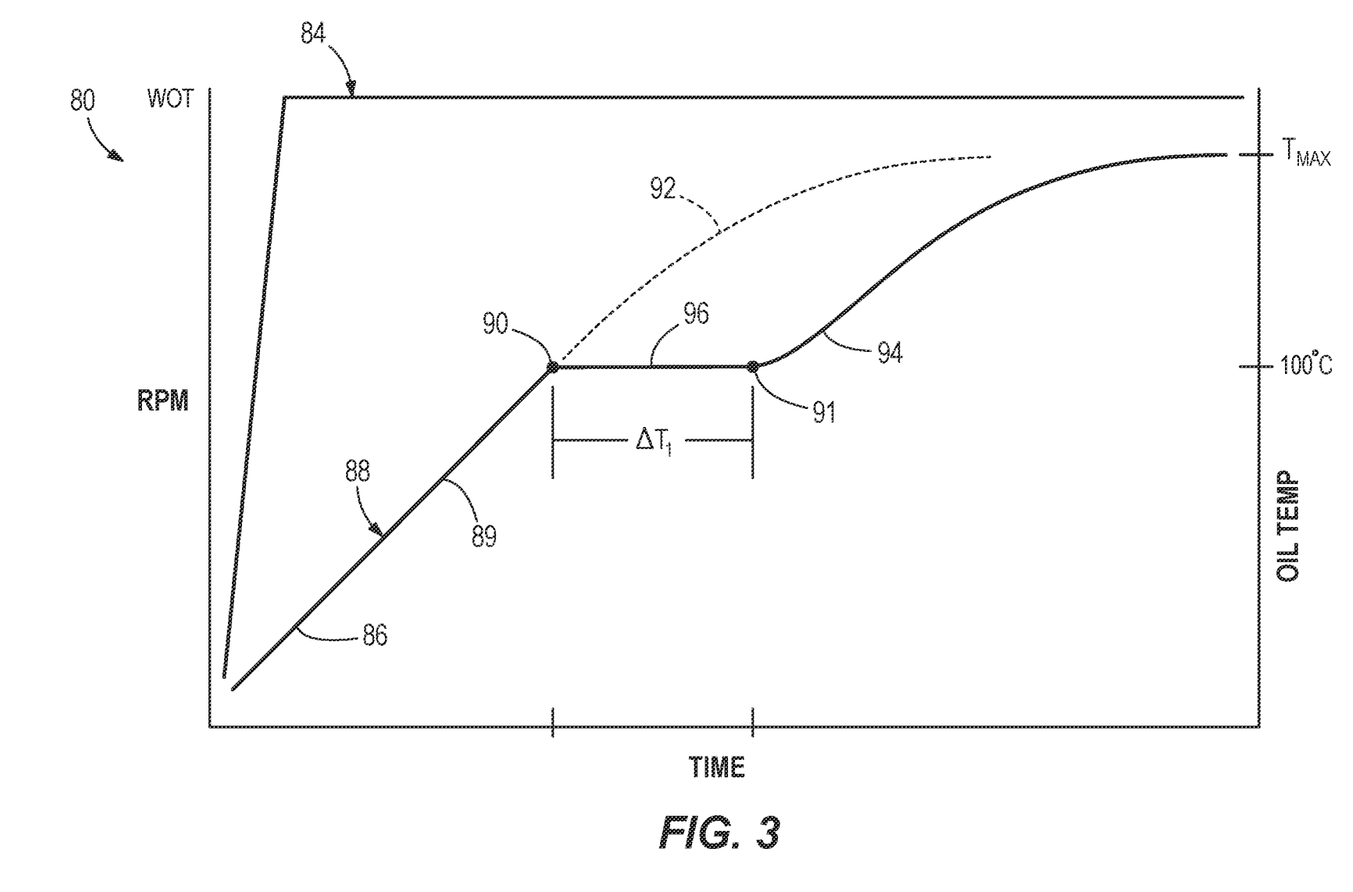
FIG. 3 is a graph illustrating the operational speed of an engine of the marine drive and the temperature of oil for the engine over time.

As previously mentioned, the novel system 43 is configured to identify the presence of water in the oil for an engine 16 of a marine drive 10 during operation of the marine drive 10 using sensed operational parameters from the engine speed sensor 47 and the oil temperature sensor 60 and/or engine oil temperature sensor 46. Referring to FIG. 3, a graph 80 illustrates the operational speed of an engine 16 and the temperature of the oil over time. Line 84 illustrates the operational speed of the engine 16 measured in RPM, and line 88 illustrates the temperature of the engine oil measured in degrees Celsius. When the marine drive 10 is operated to propel the marine vessel 14 through the water, the operational speed of the engine 16 increases as the operator controls the marine drive 10 to increase the speed of the marine drive 10. Operation of the marine drive 10 also causes the temperature of the engine oil to increase based at least partially on the operational speed of the engine 16. That is, as the operational speed of the engine 16 is increased, the temperature of the engine oil correspondingly increases.

With continued reference to FIG. 3, under normal conditions where no water is present in the engine oil, the temperature of the oil in the engine 16 will tend to steadily increase until the engine oil temperature stabilizes at a maximum temperature TMax, which may be a function of the operational speed of the engine 16 in some embodiments. In FIG. 3, the engine oil temperature under said normal conditions is illustrated by line segment 86 and segment 92. When water is present in the engine oil, however, the engine oil temperature stagnates and generally holds at 100 degrees Celsius for a period of time ΔT1. In FIG. 3, the temperature of the engine oil when water is present in the oil is indicated by line segment 86, segment 96, and segment 94. The stagnation of the temperature of the oil in the engine 16 at approximately 100 degrees Celsius occurs due to the properties of water, which dictate that the temperature of a body of water will remain at the boiling temperature of water (e.g., 100 degrees Celsius) until the entire body of water has completed a phase transition from a liquid to a gas.

Figure 7:
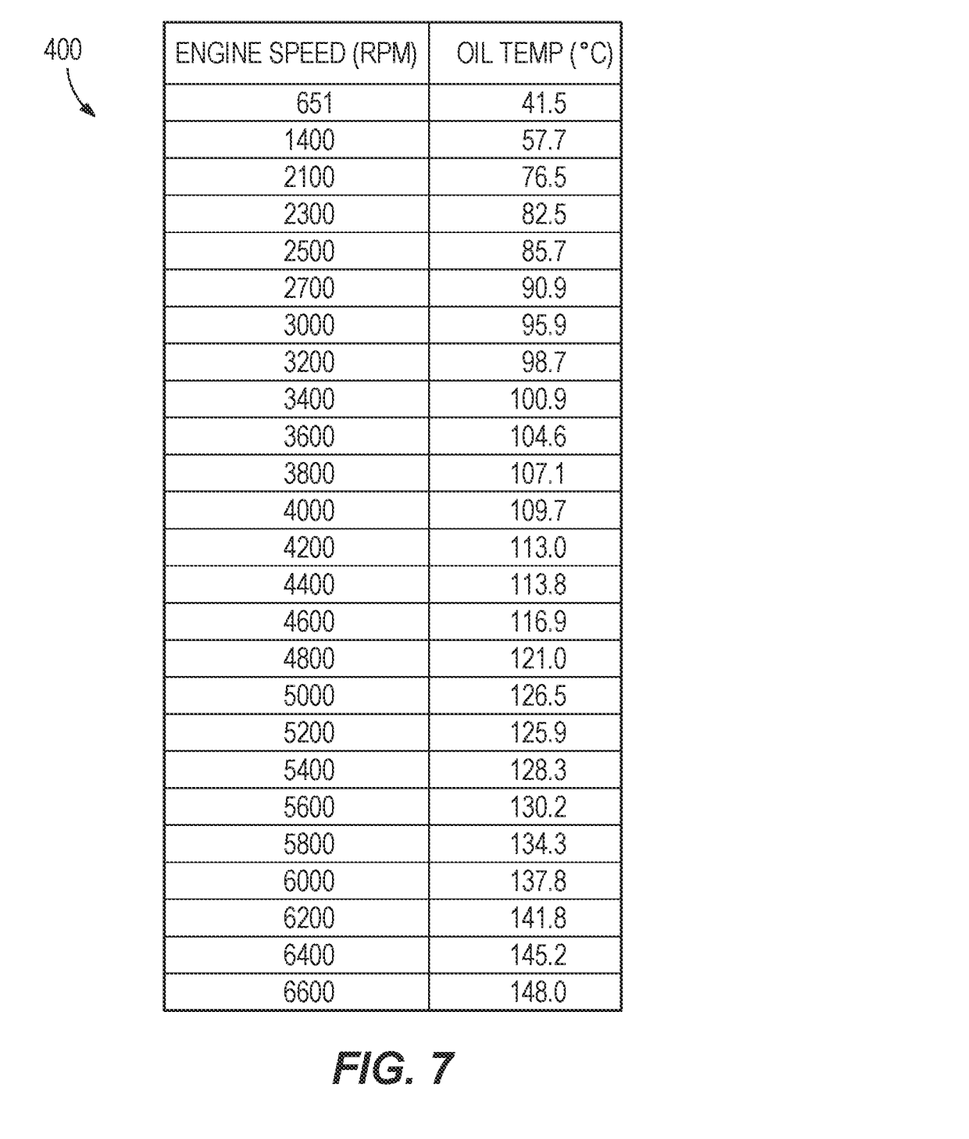
FIG. 7 is a table illustrating an engine oil temperature in relation to an operational speed of the engine.

When the engine 16 is operated at an operational speed that is above an engine speed threshold value that corresponds to a maximum engine oil temperature TMax value above 100 degrees Celsius, water present in the oil will begin to evaporate, thereby removing the contaminating water from the engine oil. Referring to FIG. 7, a table illustrating the maximum engine oil temperature TMax value associated with a range of different operational speeds of an exemplary embodiment of an engine 16 for a marine drive 10. To ensure that the water will be evaporated, the engine speed threshold value may be selected to have a corresponding maximum engine oil temperature TMax that is well above 100 degrees Celsius. For example, the engine speed threshold value may be set at 4600 RPM so that the engine oil will be heated to a maximum engine oil temperature TMax of 116.9 degrees Celsius.

Referring to FIG. 3, when the engine oil temperature reaches 100 degrees Celsius at point 90, the engine oil temperature plateaus at 100 degrees Celsius and maintains this temperature for a period of time ΔT1 until the water has evaporated from the engine oil at point 91. Once the water has been vaporized from the engine oil, the engine oil temperature will continue to increase above 100 degrees Celsius until it reaches the maximum engine oil temperature TMax corresponding to the operational speed of the engine 16.

Figure 4:
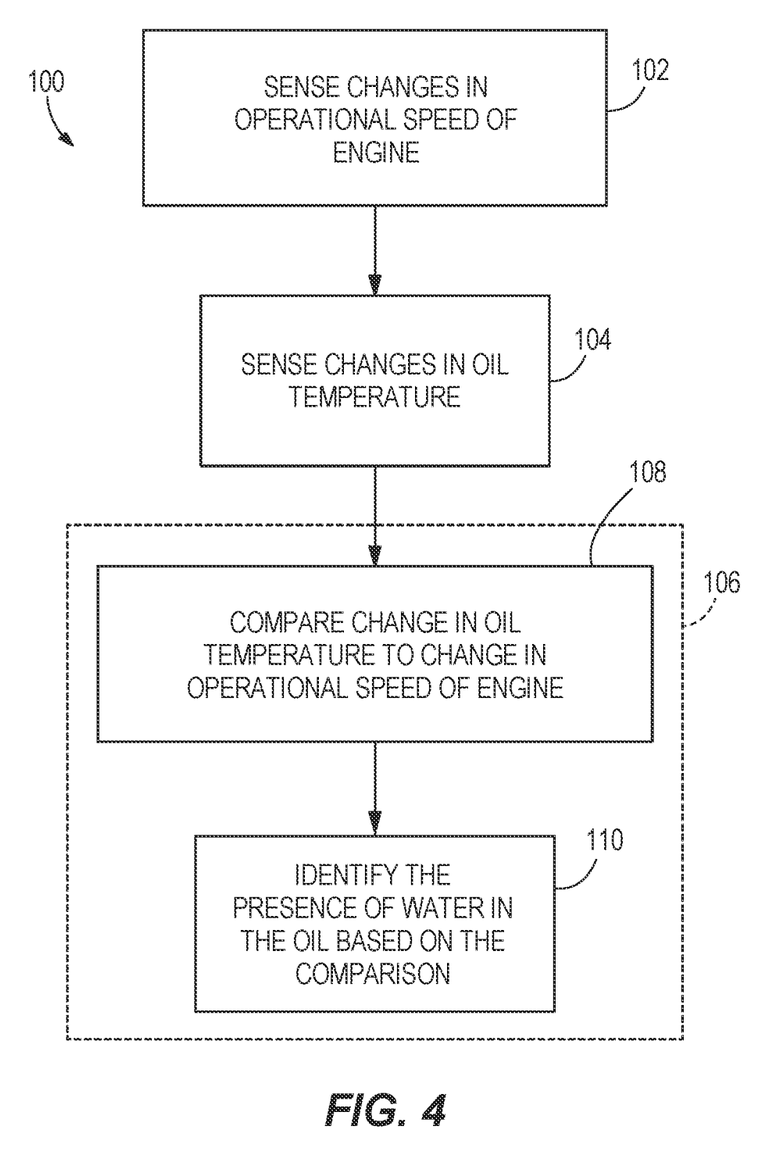
FIG. 4 is a flow chart depicting an example of a method for identifying a presence of water in oil for the engine.

Based on the behavior of water-contaminated oil illustrated in FIG. 3, the system 43 of FIG. 2 can monitor changes in the sensed operational speed of the engine 16 and the sensed temperature of the oil for the engine 16 to determine if water is present in the engine oil. For example, FIG. 4 illustrates an exemplary method 100 that can be performed by the system 43 to identify the presence of water in the engine oil. At step 102, changes in the operational speed of the engine 16 are sensed by the engine speed sensor 47 and communicated to the control module 40. In some embodiments, the engine speed sensor 47 is configured to communicate unprocessed operational speed data to the control module 40, which then calculates the change operational speed of the engine 16. Some embodiments, however, may include at least one engine speed sensor 47 that directly measures changes in operational speed of the engine 16 and communicates the measured operational speed change(s) to the control module 40.

At step 104, changes in the engine oil temperature are sensed by the engine oil temperature sensor 46 and/or the sump oil temperature sensor 60 and communicated to the control module 40. In some embodiments, the temperature sensor(s) 46, 60 are configured to communicate unprocessed temperature data to the control module 40, which then calculates the change in the engine oil temperature. Some embodiments, however, may include at least one temperature sensor 46, 60 that directly measures changes in engine oil temperature and communicates the measured temperature change(s) to the control module 40.

Based on the sensed changes to the operational speed of the engine 16 and the temperature of the engine oil, the system 43 can determine if water is present in the engine oil at step 106. For example, step 106 includes comparing the sensed change of the operational speed of the engine 16 and the sensed change of the temperature of the engine oil at step 108 before determining if water is present in the engine oil at sub-step 110. In particular, at step 110, the system 43 may make the determination that water is present in the engine oil when the sensed temperature of the engine oil remains at approximately 100 degrees Celsius for a predetermined period of time while the operational speed of the engine 16 continues to increase (for example at point 90 in FIG. 3). Thus, the novel method 100 advantageously allows the system 43 of the marine drive 10 to determine if the oil for the engine 16 is contaminated by water using existing sensors 46, 47, 60 within the marine drive.

In some embodiments, environmental conditions may result in water having a boiling temperature that is not 100 degrees Celsius. Therefore, in some embodiments the system 43 may be configured to determine that water is present in the oil if the sensed engine oil temperature remains within a temperature range that corresponds to a range of possible boiling temperatures for water and includes 100 degrees Celsius.

Figure 5:
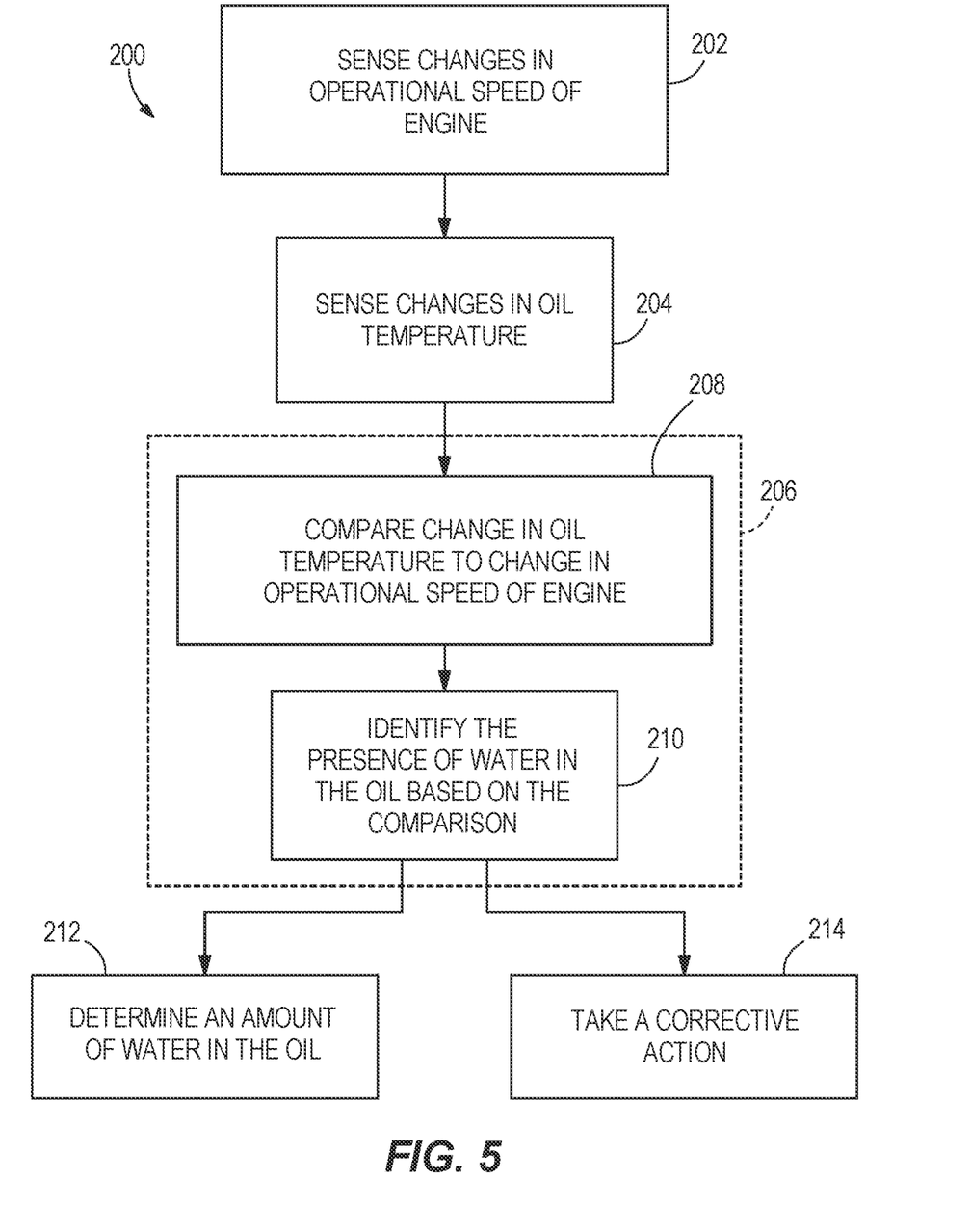
FIG. 5 is a flow chart depicting another example of a method for identifying a presence of water in oil for the engine.

In some embodiments, the system 43 may be configured to utilize the determination that water is present in the engine oil to assist a user in operating the marine drive 10. For example, FIG. 5 illustrates an exemplary method 200 that can be performed by the system 43 to identify the presence of water in the engine oil and subsequently utilize said identification to perform additional actions. In the method 200 of FIG. 5, the system 43 is configured to sense changes in the operational speed of the engine 16 at step 202, sense changes in the engine oil temperature at step 204, and to determine if water is present in the engine oil at step 206. In some embodiments, steps 202, 204, and 206 in FIG. 5 may be similar or the same as steps 102, 104, and 106 in FIG. 4. For example, similar to step 106, step 206 of the method 200 of FIG. 5 includes a step 208 for comparing the sensed change of the operational speed of the engine 16 and the sensed change of the temperature of the engine oil (similar to step 106) and a subsequent step 210 for determining if water is present in the engine oil (similar to step 110). Some embodiments of the method 200, however, may include at least one step that is different than the steps of the method 100 in FIG. 3.

With continued reference to FIG. 5, the illustrated method 200 includes additional steps 212, 214 that may be performed after the system identifies the presence of water in the engine oil at step 206. At step 212, the system 43 is configured to determine an amount of water that is (or was) present in the engine oil. In some embodiments, the amount of water present in the engine oil may be determined based on the period of time ΔT1 for which the oil temperature remains at 100 degrees Celsius (or within the predetermined temperature range). During the period of time ΔT1 for which the temperature of the oil for the engine 16 has stagnated at approximately 100 degrees Celsius, the evaporation rate of the water in the oil is a function of the operational speed of the engine 16. The evaporation rate will be generally consistent over the period of time ΔT1 required to evaporate the water when the engine operational speed is held at a particular value. Thus, the amount of water present in the engine oil may be calculated as a function of the dwell time ΔT1 and/or the operational speed of the engine 16. This may be useful, for example, in order to assist with preventative maintenance, and to notify a user when the oil filter needs to be changed and/or other maintenance is required. Additionally or alternatively, the system 43 may be configured to take a corrective action at step 214 after the presence of water in the engine oil has been identified in step 206, as discussed in further detail below in reference to FIG. 6 (step 318).

Figure 6:
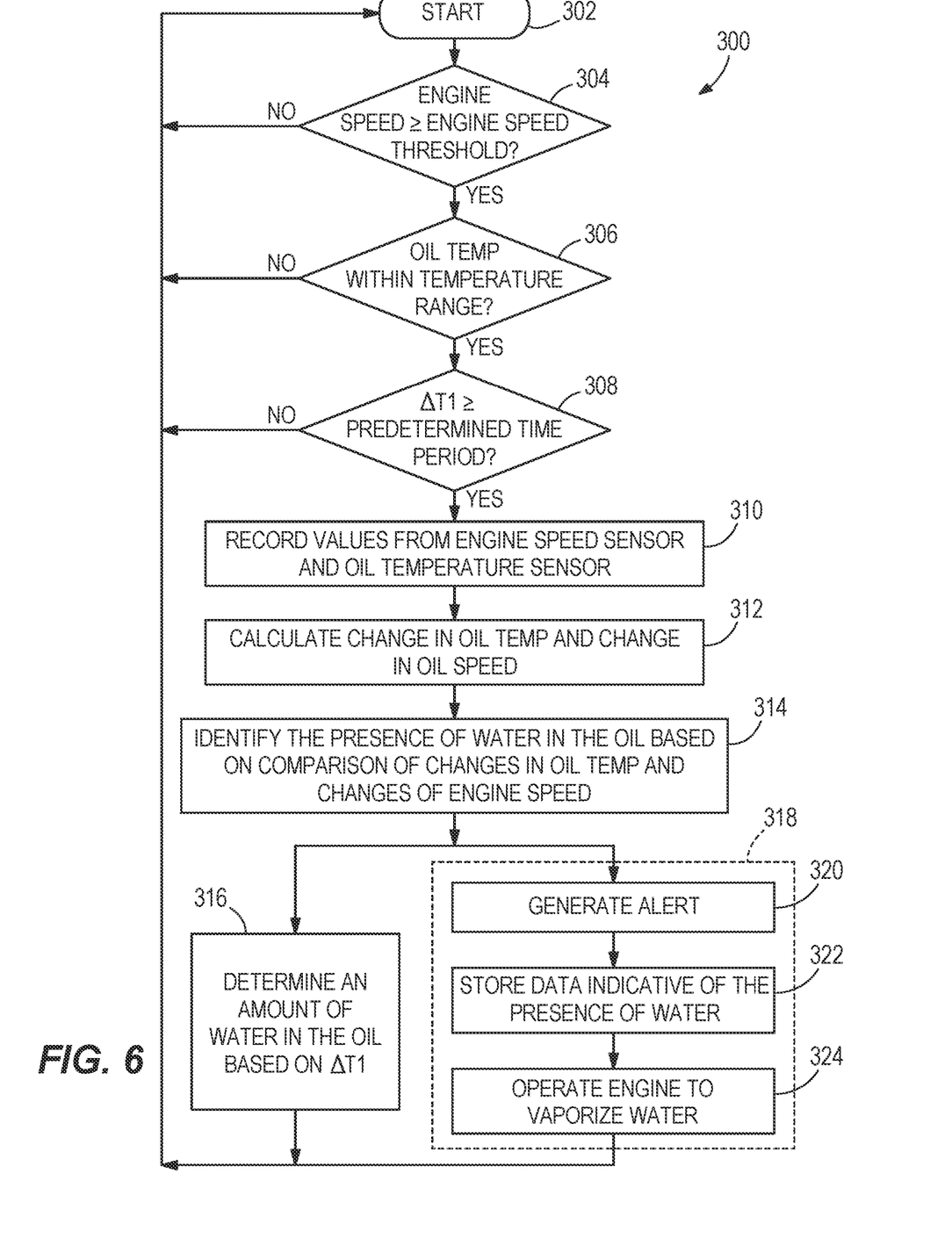
FIG. 6 is a flow chart depicting another example of a method for identifying a presence of water in oil for the engine.

Referring to FIG. 6, another exemplary method 300 for identifying the presence of water in the oil for the engine 16 is illustrated. The control module 40 initiates the water presence determination logic at step 302, for example upon key up. At step 304, instructions are executed to determine if the operational speed of the engine 16 exceeds an engine speed threshold for at least a predetermined period of time. The engine operational speed threshold may be determined based on the minimum engine operational speed required to raise the engine oil temperature to the boiling point of water so that any water in the oil begins to evaporate. Once the operational speed of the engine 16 reaches the engine speed threshold, instructions are executed at step 306 to determine if the engine oil temperature sensed by a temperature sensor 46, 60 falls within the predetermined range of temperatures corresponding to the boiling point of water. If the sensed engine oil temperature falls within the temperature range, a determination is made at step 308 to assess whether the period of time ΔT1 that engine oil temperature has remained within the temperature range exceeds a predetermined time period. If at any point in time the operational speed of the engine drops below the engine speed threshold and/or the engine oil temperature moves out of the temperature range, then the control module 40 returns to initial step 302.

When the operational speed of the engine remains above the engine speed threshold and the engine oil temperature remains within the temperature range, then a step 310 for recording the sensed engine oil temperature values, the sensed engine operational speed values, and/or the length of the period of time ΔT1 that engine oil temperature has remained within the temperature range may be performed by the system 43. At step 312, Instructions for calculating at least one of a change in the oil temperature and a change in the operational speed of the engine 16 over the time period ΔT1 are performed. The instructions executed in step 312 may be the same or different than the steps for calculating engine speed and oil temperature changes in step 108 in the method 100 of FIG. 4 and/or step 208 in the method 100 of FIG. 5. Following the calculation of the changes in engine oil temperature and the operational speed of the engine, the change in engine oil temperature is compared to the change in the operational speed of the engine to identify the presence of water in the engine oil at step 314. The instructions executed in step 314 may be the same or different than the steps for identifying the presence of water in step 110 in the method 100 of FIG. 4 and/or step 210 in the method 100 of FIG. 5.

Following the identification of water in the engine oil at step 314, instructions for determining the amount of water in the engine oil may be executed at step 316. In the illustrated embodiment, the amount of water in the engine oil is determined based on the time period ΔT1 for which the sensed engine oil temperature remained within the temperature range similarly to step 212 in the method 200 of FIG. 5. Some embodiments, however, may utilize a different method and/or different sensors in order to determine the amount of water in the engine oil.

In some embodiments, a step 318 for taking corrective action may be executed following the determination that water is present in the engine oil in step 314. In some embodiments, the step 318 for taking corrective action may include a step 320 for operating an indicator device to alert a user of the presence of water. For example, the system may be configured to operate the lamp 50 to provide a visual water presence indicator, operating the horn 52 to provide an auditory water presence indicator, operating the display dial 54 (or a digital display) to provide a water presence indicator, and/or operating any other indicator device to provide a water presence alert to a user. This may be useful, for example, to provide an alert to the user which suggests that the oil filter needs to be changed and/or that other maintenance is required.

In some embodiments, the step 318 for taking corrective action may include a step 322 for storing data indicative of the presence of water in the engine oil, this may be useful, for example, in order to assist users and/or the manufacturer in determining a cause of failure in a marine drive 10. Additionally or alternatively, data indicative of the presence of water in the engine may be stored as a marker for a warranty assessment.

In some embodiments, the step 318 for taking corrective action may include a step 324 for operating the engine 16 to evaporate the water from the engine oil. For example, step 324 includes executing instructions to operate the engine 16 at an operational speed that is high enough to vaporize the water detected in the engine oil for a set length of time. For example, referring also to FIG. 7, step 324 may include instructions to operate the engine 16 at 3600 RPM or higher in order to vaporize the water present in the engine oil.

Referring back to FIG. 6, the operational speed of the engine 16 required to raise the engine oil temperature to vaporize the water and/or the length of time the engine 16 must be operated at said operational speed may be selected based on the amount of water detected in the oil (e.g., using the amount of water determined in step 316). To reduce the time required to vaporize the water in the engine oil, a higher engine speed can be selected, for example from the table of FIG. 9. This may be useful, for example, in order to minimize (or otherwise optimize) the speed at which the engine 16 is operated and/or the length of time the engine 16 is operated at said speed in step 324.

In some embodiments, the system 43 may be configured to automatically execute instructions for operating the engine 16 to vaporize the water in the engine oil upon detection of said water. Additionally or alternatively, the system 43 may be configured to perform the step 324 for operating the engine 16 to vaporize the water when no users are present on the marine vessel 14. This may be useful, for example, in order to avoid excess noise and/or unwanted downtime of the marine drive 10.

In FIGS. 4-6, the steps included in methods 100, 200, 300 are illustrated in a sequence corresponding to an exemplary technique for performing the methods 100, 200, 300. However, it should be appreciated that at least one step in at least one of the methods 100, 200, 300 may be performed in a different order than the order depicted in FIGS. 4-6. In some embodiments, at least two of the illustrated steps may be performed concurrently. For example, in the method 300 of FIG. 6, at least two of the steps 320, 322, 324 for taking different corrective actions may be executed simultaneously. Additionally or alternatively, at least one step in the illustrated methods 100, 200, 300 may be omitted, and/or at least one additional step may be included.

In the illustrated embodiments, the system 43 is configured to use data from the engine speed sensor 47 and engine oil temperature sensor 46 to identify the presence of water in the oil when performing the methods 100, 200, 300 of FIGS. 4-6. However, some embodiments may be configured to use data from engine speed sensor 47 and the oil temperature sensor 60 to identify the presence of water in the oil. Thus, one skilled in the art will recognize that the systems and methods disclosed herein may use sensed data from the oil temperature sensor 60 may be used in addition or as an alternative to the engine oil temperature sensor 46 in order to identify the presence of water in the engine oil.

This written description uses examples to disclose the invention and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for a marine drive and/or a marine generator, the system comprising:
    an engine,
    a temperature sensor configured to sense changes in temperature of oil for the engine,
    a speed sensor configured to sense changes in operational speed of the engine, and
    a control module in communication with the temperature sensor and the speed sensor, the control module being configured to identify a presence of water in the oil when said changes in temperature of the oil stagnate while said operational speed of the engine is at or above an engine speed threshold.

2. The system according to claim 1, wherein the control module stores a temperature range and a predetermined time period, and wherein the control module is configured to identify that said changes in temperature of the oil stagnates when the temperature of the oil remains in the temperature range for said predetermined time period.

3. The system according to claim 2, wherein 100 degrees Celsius is within the temperature range.

4. The system according to claim 2, wherein the control module is configured to determine an amount of water in the oil based upon how long the temperature of the oil remains in the temperature range.

5. The system according to claim 1, wherein the control module is configured to take a corrective action when the presence of water is identified.

6. The system according to claim 5, further comprising an indicator device, wherein the corrective action comprises operating an indicator device to alert a user of the presence of water.

7. The system according to claim 5, wherein the corrective action comprises storing data indicative of the presence of water as a marker for a warranty assessment.

8. The system according to claim 5, wherein the corrective action comprises operating the engine at a speed sufficient to increase the temperature of the oil and vaporize the water.

9. A method of identifying a presence of water in oil for an engine associated with a marine drive and/or a marine generator, the method comprising:
    sensing changes in temperature of the oil,
    sensing changes in operational speed of the engine, and
    identifying the presence of water in the oil by determining when said changes in temperature of the oil stagnate while said operational speed of the engine is at or above an engine speed threshold.

10. The method according to claim 9, comprising identifying that said changes in temperature of the oil stagnates when the temperature of the oil remains in a temperature range for a predetermined time period.

11. The method according to claim 10, wherein 100 degrees Celsius is within the temperature range.

12. The method according to claim 10, comprising determining an amount of water in the oil based upon how long the temperature of the oil remains in the temperature range.

13. The method according to claim 9, further comprising taking a corrective action when the presence of water is identified.

14. The method according to claim 13, wherein the corrective action comprises operating an indicator device to alert a user of the presence of water.

15. The method according to claim 13, wherein the corrective action comprises storing data indicative of the presence of water as a marker for a warranty assessment.

16. The method according to claim 13, wherein the corrective action comprises operating the engine at a speed sufficient to increase the temperature of the oil and vaporize the water.

* * * * *